(12) United States Patent
Diedrichs

(10) Patent No.: US 9,143,071 B2
(45) Date of Patent: Sep. 22, 2015

(54) METHOD FOR CONTROLLING A WIND TURBINE

(75) Inventor: Volker Diedrichs, Wardenburg (DE)

(73) Assignee: Wobben Properties GmbH, Aurich (DE)

(*) Notice: Subject to any disclaimer, the term of this patent is extended or adjusted under 35 U.S.C. 154(b) by 74 days.

(21) Appl. No.: 14/125,828

(22) PCT Filed: May 24, 2012

(86) PCT No.: PCT/EP2012/059782
§ 371 (c)(1),
(2), (4) Date: Mar. 5, 2014

(87) PCT Pub. No.: WO2012/171769
PCT Pub. Date: Dec. 20, 2012

(65) Prior Publication Data
US 2014/0184174 A1    Jul. 3, 2014

(30) Foreign Application Priority Data

Jun. 16, 2011   (DE) .......................... 10 2011 077 651

(51) Int. Cl.
*H02P 9/10*       (2006.01)
*H02P 9/14*       (2006.01)
(Continued)

(52) U.S. Cl.
CPC ................ *H02P 9/14* (2013.01); *F03D 7/0272* (2013.01); *H02K 7/09* (2013.01); *H02K 19/26* (2013.01); *H02P 29/0038* (2013.01); *H02K 7/1838* (2013.01); *H02K 2201/03* (2013.01); *H02K 2213/03* (2013.01); *H02K 2213/09* (2013.01); *H02P 2101/15* (2015.01); *Y02E 10/723* (2013.01)

(58) Field of Classification Search
USPC .............. 322/29, 46, 61; 290/40 B; 310/68 B
See application file for complete search history.

(56) References Cited

U.S. PATENT DOCUMENTS 4,168,459 A * 9/1979 Roesel, Jr. ...................... 322/29
4,319,175 A   3/1982 Leenhouts
(Continued)

FOREIGN PATENT DOCUMENTS

DE         197 29 034 A1    1/1999
DE    10 2006 056 893 A1    6/2007
(Continued)

OTHER PUBLICATIONS

C. Patsios, et al. "Particular Electromagnetic Field Computation for Permanent Magnet Generator Wind Turbine Analysis", Magnetics, IEEE Transactions on, vol. 46, No. 8, pp. 2751-2754, Aug. 2010.

*Primary Examiner* — Pedro J Cuevas
(74) *Attorney, Agent, or Firm* — Seed IP Law Group PLLC

(57) ABSTRACT

The present invention concerns a method of controlling a wind power installation having a generator with a stator, a pole wheel with at least two rotor poles with a respective pole winding for producing a magnetic field guided in the respective rotor pole, and an air gap between the stator and the pole wheel, including the steps—controlling a respective exciter current through each pole winding,—varying at least one of the exciter currents relative to at least one further one of the exciter currents, and/or—varying at least one of the exciter currents in dependence on the position of the pole wheel in relation to the stator.

15 Claims, 7 Drawing Sheets

(51) Int. Cl.
  *F03D 7/02* (2006.01)
  *H02K 19/26* (2006.01)
  *H02K 7/09* (2006.01)
  *H02P 29/00* (2006.01)
  *H02P 11/00* (2006.01)
  *H02H 7/06* (2006.01)
  *H02K 7/18* (2006.01)
  *H02P 101/15* (2015.01)

(56) References Cited

U.S. PATENT DOCUMENTS

| | | | |
|---|---|---|---|
| 4,319,176 A | 3/1982 | Akamatsu | 318/716 |
| 5,083,077 A * | 1/1992 | Wallace et al. | 322/32 |
| 5,625,276 A * | 4/1997 | Scott et al. | 322/24 |
| 5,886,504 A * | 3/1999 | Scott et al. | 322/15 |
| 5,900,722 A * | 5/1999 | Scott et al. | 322/46 |
| 6,018,200 A * | 1/2000 | Anderson et al. | 290/40 B |
| 6,118,186 A * | 9/2000 | Scott et al. | 290/40 B |
| 6,268,675 B1 * | 7/2001 | Amrhein | 310/90.5 |
| 7,049,719 B2 * | 5/2006 | Wobben | 310/80 |
| 7,095,206 B2 * | 8/2006 | Lequesne et al. | 318/254.1 |
| 7,259,490 B2 * | 8/2007 | Wobben | 310/162 |
| 8,044,528 B2 * | 10/2011 | Roesmann | 290/44 |
| 8,222,847 B2 * | 7/2012 | Strothmann | 318/400.34 |
| 8,305,021 B2 * | 11/2012 | Meyer | 318/400.3 |
| 8,742,715 B2 * | 6/2014 | Ortman et al. | 318/660 |
| 2004/0245868 A1 * | 12/2004 | Wobben | 310/68 B |
| 2005/0264254 A1 * | 12/2005 | Lequesne et al. | 318/701 |
| 2006/0192445 A1 * | 8/2006 | Wobben | 310/68 B |
| 2007/0216244 A1 * | 9/2007 | Edelson | 310/90.5 |
| 2009/0121485 A1 * | 5/2009 | Roesmann | 290/44 |
| 2009/0134628 A1 | 5/2009 | Stiesdal | |
| 2009/0278485 A1 * | 11/2009 | Strothmann | 318/400.33 |
| 2010/0052626 A1 * | 3/2010 | Tupper et al. | 322/61 |

FOREIGN PATENT DOCUMENTS

| | | |
|---|---|---|
| DE | 10 2008 002358 A1 | 12/2009 |
| JP | 2005-304271 A | 10/2005 |
| RU | 2 130 690 C1 | 5/1999 |
| RU | 2 339 147 C1 | 11/2008 |
| WO | 91/05953 A1 | 5/1991 |

* cited by examiner

METHOD FOR CONTROLLING A WIND TURBINE

BACKGROUND

1. Technical Field

The present invention concerns a method of controlling a wind power installation. The invention further concerns a wind power installation.

2. Description of the Related Art

Wind power installations are generally known and FIG. 1 shows the general structure of a wind power installation. The aerodynamic rotor is caused to rotate by wind and thereby drives an electromechanical rotor of a generator. In that respect the present invention concerns a wind power installation which uses a synchronous generator. Thus a pole wheel or motor rotor of the synchronous generator is rotated relative to a stator of the latter. Electric current is generated in the stator by the relative rotary movement of the pole wheel with respect to the stator so that kinetic energy of the wind is converted into electric energy.

Between the pole wheel and the stator there is an air gap which represents a considerable magnetic reluctance in a magnetic circuit between pole wheel and stator. That magnetic reluctance depends in particular on the thickness of the air gap and the thickness of the air gap is therefore selected to be as small as possible. The invention concerns in particular gearless wind power installations in which therefore the pole wheel is connected to the aerodynamic rotor without an interposed transmission and rotates at the same rotary speed as the aerodynamic rotor. The usual rotary speeds here are in the range of between about 5 and 15 revolutions per minutes for relatively large wind power installations having a nominal power output of more than 1 MW. The diameter of such generators in the region of the air gap—also referred to as the air gap diameter—is usually at least several meters, that is to say at least 2 or 3 m, and can reach up to 10 m in the case of installations known at the present time. The magnitude of the air gap is also slight in such large generators and is usually only a few mm.

Any eccentricities of stator and pole wheel lead to differing thicknesses of the air gap. Elasticities of the components and thus as a result in particular the pole wheel and possibly also the stator can also lead to differing thicknesses of the air gap in the peripheral direction, more specifically in particular under the influence of mass, gravitational and magnetic forces.

By virtue of a reduction in the air gap magnitude in a given region, the magnetic reluctance decreases in the region, while the magnetic flux density increases. That in turn leads to an increased radial force density and can result in an additional reduction in the air gap thickness, this also depending on the respectively relevant elasticities. That therefore affords a boosting effect.

Contact between the pole wheel and the stator is to be avoided in any case. They are therefore to be mechanically stiffened in such a way that the magnetic forces inevitably caused by production and assembly tolerances and by material elasticities can be absorbed by the carrier structure. With an increasing diameter for the generator, the material usage caused thereby increases greatly and considerably increases the mass of the generator. That gives rise to high material costs for the generator as such, and also for the components carrying the generator, in particular the machine bearer and also the azimuth bearing which supports the machine bearer including the generator to permit wind tracking.

As general state of the art attention is to be directed to DE 10 2006 056 893 A1 and to C Patsios, A Chaniotis, E Tsampouris and A Kladas; 'Particular Electromagnetic Field Computation for Permanent Magnet Generator Wind Turbine Analysis', Magnetics, IEEE Transactions on, Vol 46, No 8, pages 2751-2754, August 2010.

BRIEF SUMMARY

One or more embodiments of the present invention are directed to a way of reducing the weight of the generator and/or providing an improved ratio between weight and nominal power output of the generator. In particular, one embodiment seeks to achieve a weight savings or provide an alternative solution.

According to one embodiment of the invention there is provided a method of controlling a wind power installation having a synchronous generator with a stator and a pole wheel with at least two rotor poles with a respective pole winding for producing a magnetic field guided in the respective rotor pole. An air gap is formed between the stator and the pole wheel. A respective exciter current is controlled through each pole winding. At least one of the exciter currents is varied relative to at least a further one of the exciter currents. Therefore pole windings receive different exciter currents. That variation can be permanent or can be effected intermittently. In the case of an intermittent variation that can be effected cyclically and/or in dependence on other parameters or measurement values. Additionally or alternatively the variation of at least one of the exciter currents can be effected in dependence on the position of the pole wheel in relation to the stator. Thus there is proposed individual control of the exciter currents. That individual exciter current control is intended to take account in particular of a differing air gap thickness.

In particular there was an increase in the exciter current of a pole in relation to a mean exciter current if the thickness of the air gap in respect of that rotor pole is greater than a mean air gap thickness. Conversely a lower exciter current is proposed in relation to a pole, in respect of which the air gap thickness is less than a mean air gap thickness.

A smaller air gap thickness gives a higher attractive force action between the rotor pole and the stator. That is counteracted by the reduction in the exciter current as described. Depending on respective external circumstances that can result in an increase in the air gap thickness. At least an increased loading in the region of such an air gap which is reduced in thickness is counteracted by the reduction in exciter current.

The specific manner of controlling the respective exciter current also depends on the reason or reasons for the occurrence of different air gap thicknesses.

Preferably at least one of the exciter currents is varied in rotationally cyclic fashion. That exciter current will for example always assume its maximum value at a given position of the pole wheel, that is to say at a given position of the pole in question. If for example there is exclusively a weight-dependent elastic deformation of the pole wheel, in which respect it is assumed that the wind power installation is a horizontal-axis installation and the axis of the generator is also substantially horizontal, then the air gap would be at its smallest in a lower region of the generator, that is to say in the region of a so-called 6 o'clock position, and at its greatest in the upper region of the generator, that is to say at a so-called 12 o'clock position. That is for an internal rotor member and would be precisely the opposite for an external rotor member. That is an explanation by way of example for the ideal situation, that otherwise the generator and in particular the rotor, that is to say the pole wheel, are of an optimum configuration. This description also assumes there is an elastic deformation of the rotor. In that case therefore the exciter current of the pole in question would be of a minimum value in its 6 o'clock position and a maximum value in its 12 o'clock position. In this example a proposed variation in the current could be continuous. Depending on the respective specific structure of the rotor, that example can apply at least qualitatively to the same extent for further and possibly all rotor poles. In that case each exciter current would be varied in rotationally cyclic relationship and would be of its minimum value in the respective 6 o'clock position of the pole in question and its maximum value in the 12 o'clock position.

Alternatively or additionally at least one of the exciter currents is controlled asynchronously relative to a further exciter current. The described rotationally cyclic variation can represent an example of that asynchronous control, if it applies for a plurality of or all rotor poles. As described, in the example, the exciter currents of the rotor poles which are precisely in the 6 o'clock position are of their minimum value and the exciter currents of the rotor poles which at that moment are in the 12 o'clock position are of their maximum value and thus those exciter currents would be controlled asynchronously relative to each other. It is however also considered that exciter currents of different rotor poles can be controlled differently for different reasons, at least in their quantity. A rotationally cyclic variation can also be provided in the case of a constant deformation of the stator.

Additionally or alternatively at least one of the exciter currents can be altered by a constant compensation component, that is to say reduced or increased. Such a reduction or increase is on the one hand to be understood as a quantitative increase in relation to a mean exciter current in relation to all rotor poles, irrespective of the nature of the implementation. Alternatively or additionally that reduction or increase however also concerns the possibility of an implementation in terms of structure, control technology and/or circuitry technology, insofar as the structure, the control or the circuitry respectively provides a mean or normal exciter current and in addition a respective reducing or increasing exciter current component is added. Thus, structurally, there can be an additional turn on the rotor pole to supplement an exciter current to increase the total exciter current or to lead to a reduction, if the sign is the opposite. In terms of control technology, for example a reduction or increase can be effected by a suitable change in the reference value and can be correspondingly detected by control technology. In terms of circuitry technology, a circuitry element can be provided for supplementing or removing a current component, or for strengthening or weakening the exciter current. These are only examples which can also be combined.

A constant compensation component is advantageous for example if the pole wheel has a deformation in the region of the rotor pole in question and/or the pole wheel, in the region of that rotor pole, has a radius which is increased or reduced in relation to the mean radius and thus the thickness of the air gap is reduced or increased in the region of that rotor pole. In that case that reduced or increased air gap thickness rotates with the rotor pole. Thus, in the case of a reduced air gap thickness in relation to that rotor pole, there would always be, in the region of that rotor pole, an increased force action between pole wheel and stator, which can be counteracted by the constant compensation component. Such a deformation also has an influence on the magnetic induction in said region and here too there can also be a permanent regulating intervention by virtue of the described constant compensation component.

The provision of a constant compensation component can be combined with a dynamically variable compensation component like the rotationally cyclic variation.

Preferably the exciter current of at least one rotor pole is controlled in dependence on an instantaneous spacing of the rotor pole in question relative to the stator, in particular in dependence on the instantaneous air gap thickness in the region of the rotor pole in question. The above-discussed considerations were also based on control and/or variation of the exciter currents, which address the problems of differing air gap thicknesses. It is however desirable for that respective instantaneous air gap thickness in relation to the respective rotor pole to be taken into consideration directly. Taking it into consideration in that way can be effected by measurement, in particular continuous measurement. The term continuous measurement is used in this respect to denote at least multiple measurement during a revolution of the pole wheel. The air gap thickness however can also be ascertained by one or more preliminary measurements and can then be taken into account by computing technology. In other words it can be on the one hand possibly extrapolated or interpolated and on the other hand can be calculated on the basis of previously detected relationships in dependence on the pole wheel position respectively, that is to say in dependence on the respective position of the rotor pole in question. Direct implementation can also be considered, for example on an analog basis, of an air gap thickness measurement for controlling the exciter current. For example, in the case of one, a plurality of or each respective rotor pole, an air gap thickness-dependent voltage can control a transistor for controlling or influencing the exciter current of the respective rotor pole.

In a further embodiment it is proposed that the exciter current of at least one rotor pole be controlled in dependence on the instantaneous magnetic field in the region of the rotor pole in question, in particular in dependence on the magnetic field in the air gap in the region of the rotor pole in question. Here too measurement for example can be provided, which actuates a corresponding control means. For example the output voltage of a Hall sensor controls the input voltage of a transistor. Equally such a value of a magnetic field can be converted by computing technology. Equally the instantaneous value of the magnetic field can also or additionally be detected by computation. For that purpose for example a state observer can be considered, to give just one example. An air gap thickness-dependent and magnetic field-dependent control of the respective exciter current can also be combined. Preferably, upon a variation in an exciter current of a rotor pole, the control and/or variation in the rotor current of one or more adjacent rotor poles is taken into consideration. That is based on the notion that, particularly in the case of pole wheels with a multiplicity of rotor poles, for example 72 rotor poles, the variation in the exciter current of such adjacent rotor poles can also influence the air gap thickness for said adjacent further rotor poles. A joint consideration procedure is therefore a preferred variant. The joint consideration can be effected for example by a multi-value regulation, that is to say regulation with a plurality of input values and a plurality of output values which find common consideration in the regulating procedure.

In a further configuration the method is characterized in that at least one of the exciter currents is controlled in dependence on previously detected asymmetries of the stator, the pole wheel and/or the air gap. Asymmetries can occur previously by measurement of the synchronous generator such as for example geometric measurement. In particular prior measurement can be effected by a test run or in a test run, by for example the generator being rotated with uniform excitation of the rotor, and by the generator being measured in that case, by the currents generated in the stator windings being measured and by the relative position of the rotor in the stator being associated, and/or wherein it is detected whether there is a relationship with respect to the rotor position. If asymmetries are known beforehand, they can be compensated in particular in the above-described manner, wherein continuous measurement of asymmetries or the effects thereof can be omitted in operation. Nonetheless the exciter currents are preferably determined beforehand in dependent relationship as asymmetries are controlled in the form of asymmetries which are also constantly monitored in dependent relationship during operation. Accordingly a combined mode of operation is preferably proposed.

The method in a further configuration is characterized in that at least one exciter current is controlled so that rotationally cyclic variations in the air gap thickness and/or variations in the air gap thickness in the peripheral direction are at least partially counteracted.

A rotationally cyclic variation in the air gap thickness is a variation which occurs cyclically upon rotation of the rotor. Such a rotationally cyclic variation is caused in particular by an asymmetry of the rotor. If the rotor is of a larger diameter at one location than at other locations, then here the air gap is basically smaller.

A variation in the air gap thickness in the peripheral direction is a variation concerning an absolute position of the air gap. Such a variation is caused in particular by an asymmetric stator. It is therefore proposed that at least one exciter current is controlled so that at least one of those variations in the air gap thickness is counteracted. In that respect, a constant compensation current component of the at least one exciter current can be appropriate for a rotationally cyclic variation for compensation purposes. In the case of an asymmetry in the peripheral direction, it may be appropriate to control one, a plurality of or all exciter currents in the rotor in rotationally cyclic fashion for compensation purposes.

It is preferably proposed that the air gap thickness in the region of at least one rotor pole and/or the magnetic flux density in the air gap in the region of at least one rotor pole is measured, and at least one of the exciter currents is controlled in dependence on the at least one measured air gap thickness, and/or in dependence on the at least one measured magnetic flux density. In that way, in dependence on the immediate situation, the respective exciter current can be currently adjusted and adapted to the current measured situations. In that respect, values can be measured online and evaluated by way of a computer system or a microcontroller and suitable exciter currents or at least one thereof can be controlled in co-ordinated dependent fashion. Preferably measurement values act directly on at least one exciter current to be controlled. In particular an analog procedure can be provided for that purpose, in which a measurement current is set for example in dependence on a measured air gap thickness and/or in dependence on a measured magnetic flux density, the measurement current directly controlling a corresponding exciter current or a plurality thereof. Such a control can be effected for example by means of a transistor.

Preferably the exciter current of at least one rotor pole is increased when the air gap thickness in the region of said rotor pole is increased and/or the exciter current of said rotor pole is reduced when the air gap thickness in the region of said rotor pole is reduced. That takes account of the realization that an increased air gap thickness can lead to an attenuation, which is to be at least partially compensated by an increase in the exciter current in question. In addition an increase in an exciter current in the region in question causes an increase in a magnetic attraction force between rotor and stator, and that can possibly lead to a reduction in the air gap thickness. In the case of a detected reduction in the air gap thickness, the counterpart measure is correspondingly proposed, namely a reduction in at least one exciter current in question.

Further preferably there is proposed a method in which the variation in the at least one exciter current is effected only in a part of the pole winding in question and/or the variation in the at least one exciter current is effected so that a part of the respective pole winding is electrically switched on or off. Accordingly that is based on a pole winding having at least two regions, that is to say at least two sub-windings, of which at least one is provided for a base exciter current which is not altered for any compensations of asymmetries of the air gap or the like. At least one further sub-winding is provided for an exciter current portion for compensation purposes. In the simplest case here an exciter current component is switched on or off for compensation purposes. Preferably the magnitude of that compensating exciter current component is varied according to the respective requirements involved. For that purpose there can be provided a corresponding circuit which is only effectively connected to that winding portion.

In addition according to one embodiment of the invention there is proposed a wind power installation that includes a synchronous generator, a stator, a pole wheel and an air gap between stator and pole wheel. The pole wheel which for simplicity can also be referred to as the rotor, has at least two rotor poles with a respective pole winding for producing a magnetic field guided in the respective rotor pole. In addition there is a control for controlling a respective exciter current through each of the pole windings. That control is adapted to vary at least one of the exciter currents relative to at least one further one of the exciter currents and/or to vary at least one of the exciter currents in dependence on the position of the pole wheel in relation to the stator.

In operation of the synchronous generator the pole wheel of the synchronous generator produces a magnetic field in the pole wheel, which upon rotation of the pole wheel leads to an induction of electric voltage and as a consequence the electric current thereof. If the magnetic field is not produced with constant magnets, it is usually provided by a direct current which flows through pole windings of the rotor poles and thereby produces the magnetic field in question. Depending on the respective operating condition of the wind power installation in which the synchronous generator in question is operated, there can be a variation in the magnetic field of the pole wheel and thus a variation in the exciter current. Such a variation however usually involves the entire pole wheel and in known wind power installations the synchronous generators are also not at all intended in terms of structural engineering for providing a differentiated control of the exciter current or currents.

In comparison it is now proposed that at least one exciter current of a rotor pole is varied relative to a further exciter current of a further rotor pole of the same pole wheel. This therefore involves a differentiated variation and thus differentiated control of exciter currents within the pole wheel. That control can take account of asymmetries within the pole wheel or asymmetries of the pole wheel and can intervene in specifically targeted fashion in terms of control technology. Alternatively or additionally the control is adapted to vary at least one of the exciter currents in dependence on the position of the pole wheel, in particular a rotationally cyclic variation can be achieved thereby. That is fundamentally different from a previously known adjustment of an entire exciter current at best in dependence on an operating condition of a wind power installation, in particular in dependence on the prevailing wind speeds. Such a control in dependence on the position of the pole wheel must be effected substantially faster and in addition—alternatively or additionally—takes account of other input parameters, at least one other input parameter.

In particular the control is adapted to control the synchronous generator in the way as was described hereinbefore in connection with the method of controlling a wind power installation.

Preferably, in relation to a plurality of the pole windings, in particular each pole winding, there is provided at least one individual control means for varying, in particular throttling, the exciter current in question. In that way the exciter current can be separately controlled individually in relation to a plurality of and in particular each pole winding. That makes it possible overall to provide for suitable differentiated control of the exciter currents and thus differentiated control of the magnetic fields of the pole wheel or the synchronous generator. Such an individual control means can be a switch, in particular a semiconductor switch like a transistor or thyristor.

In an embodiment the wind power installation includes at least one spacing measuring means for measuring the air gap thickness in the region of a respective rotor pole and/or at least one flux density measuring means for measuring the magnetic flux density in the air gap in the region of a respective rotor pole, wherein the spacing measuring means or the flux density measuring means is connected to the control so that control of at least one exciter current can be effected in dependence on a measured air gap thickness and/or in dependence on a measured magnetic flux density. It is thus proposed that measuring means for measuring the air gap thickness and/or the magnetic flux density in the air gap are linked to the control so that the air gap thickness or the magnetic flux density intervenes in terms of exciter current control. In particular control is effected in such a way that the exciter current is increased in the case of a larger air gap thickness—for example in comparison with an average air gap thickness. Likewise the exciter current in question can also be increased in the case of a weaker magnetic flux density—for example in comparison with an average magnetic flux density. That makes it possible to easily implement an exciter current control which intervenes in compensating relationship.

Preferably the synchronous generator is in the form of a ring generator. A ring generator is a generator in which the magnetically operative elements of stator and rotor are approximately of a ring-shaped configuration, namely along the air gap. The magnetic field or fields—depending on the respective way in which the situation is considered—are provided substantially in the region of that ring, that is to say in the region of the air gap, and magnetic field lines therefore do not extend substantially through the center of rotation of the generator. In particular a preferred embodiment concerns a multi-pole rotor having at least 20, at least 30, in particular at least 40 rotor poles. Such ring generators are of a comparatively large diameter and for stabilization thereof usually require a correspondingly large and thus heavy structure. One or more embodiments of the invention affords the possibility of at least partially compensating for any asymmetries and/or operationally induced deformation phenomena by a specifically targeted intervention in terms of control technology. Accordingly the structure for stabilizing the rotor or pole wheel can be less heavy, which permits a saving of material. When using a multi-pole generator moreover there are many different intervention options for exciter current control, such as for example in relation to each pole of the pole wheel.

According to one embodiment there is also proposed a synchronous generator which has the generator features described in connection with a wind power installation, including the features of the control system used, and is preferably adapted to perform one of the described methods. In the case of a wind power installation, the magnitude of its nominal power output is also to be viewed as a feature for a synchronous generator of the wind power installation. Preferably such a synchronous generator has a nominal power output of at least 100 kW, further preferably at last 250 kW and in particular at least 500 kW, further preferably at least 1 MW. Preferably there is provided a synchronous generator having a nominal power output of 2 MW or a power of more than 2 MW. Such a synchronous generator can be provided for use in a modern wind power installation.

Various embodiments of the invention are preferably used with a synchronous generator having an air gap diameter of more than 2 meters, in particular more than 3 meters and particularly preferably more than 5 meters, like for example also a diameter of 7 meters or 10 meters. In the case of such large air gap diameters which require a correspondingly large rotor diameter, the material loading in respect of conventional synchronous generators is particularly great and the invention therefore provides a corresponding potential for saving. In addition, in the case of such large diameters, it is also necessary to reckon on correspondingly strong effects on the currently prevailing geometry due to control of the exciter currents.

At least one embodiment of the present invention concerns synchronous generators in which the magnetic field is produced in the pole wheel by means of an exciter current or a plurality of exciter currents. Likewise at least on embodiment of the present invention can additionally be used in relation to a synchronous generator having a pole wheel with constant magnets.

BRIEF DESCRIPTION OF THE SEVERAL VIEWS OF THE DRAWINGS

The invention is described in greater detail by way of example hereinafter by means of embodiments with reference to the accompanying drawings.

DETAILED DESCRIPTION

The invention is described hereinafter by means of some diagrammatic views. Many similar elements are in part shown differently in the different views. For the sake of enhanced clarity however identical references are used for elements which are the same but possibly not identical, in particular for elements which are the same in function.

Figure 1:
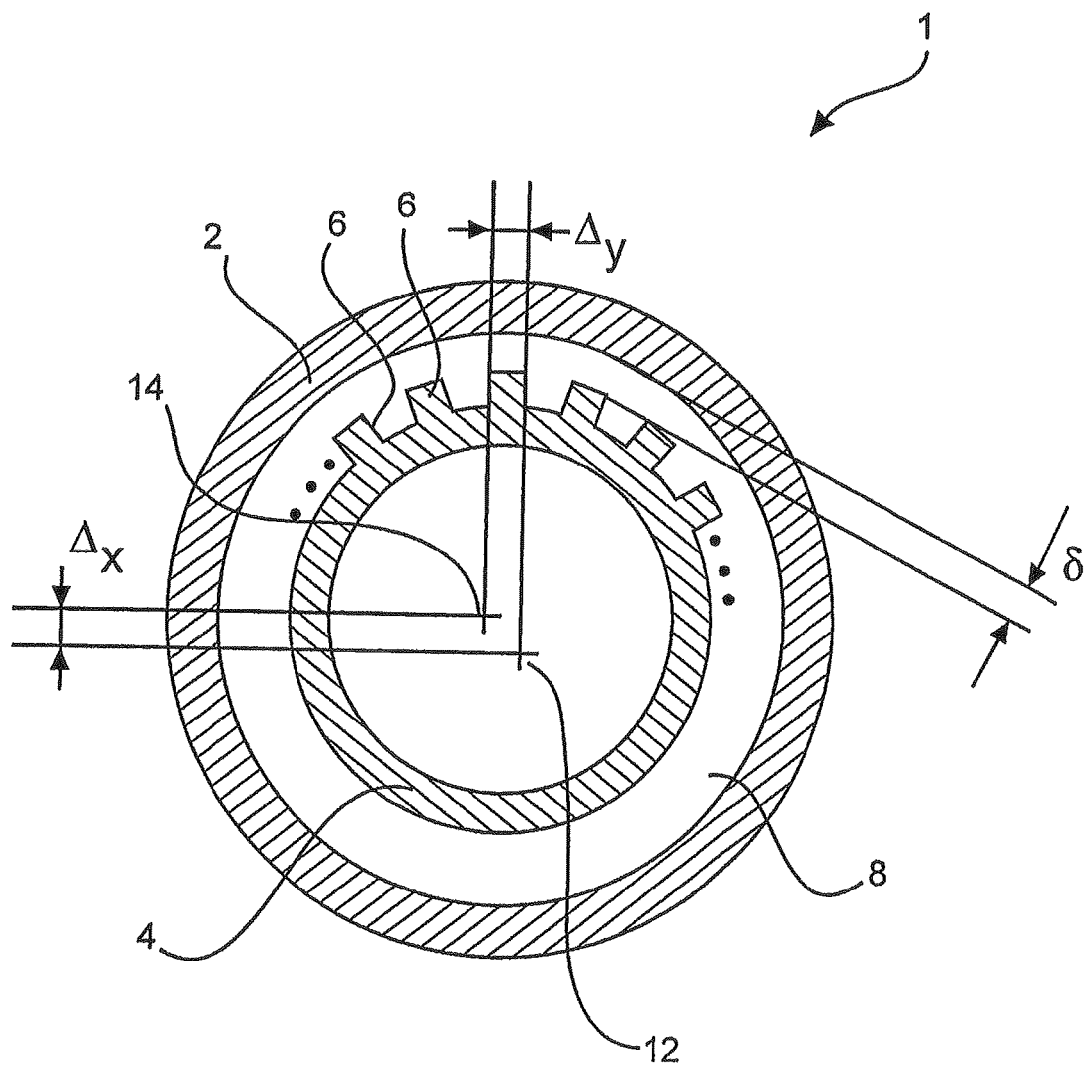
FIG. 1 shows a diagrammatic sectional view of an example of an eccentricity of the center points of stator and pole wheel of a generator.

A synchronous generator 1 which is shown in FIG. 1 in the form of a ring generator has a stator 2 and a rotor 4. The rotor 4 carries a multiplicity of rotor poles 6 of which only some are shown by way of example. An air gap 8 whose thickness δ can vary is between the rotor 4, the outer periphery of which is determined by the rotor poles 6, and the stator 2. FIG. 1 shows by way of illustration and example a stator center point 12 and a rotor center point 14. Ideally those two center points 12 and 14 should be in mutually superposed relationship. If however they are not mutually superposed, a differing air gap thickness δ can result therefrom, as shown in FIG. 1. The displacement of the center points can be referred to as the eccentricity Δ. To be able to take account of different directions of that eccentricity Δ, FIG. 1 shows by way of example an eccentricity $Δ_x$ in a first direction and $Δ_y$ in a second direction perpendicular to the first direction. The rotor 4 can also be referred to as the pole wheel 4.

Figure 2:
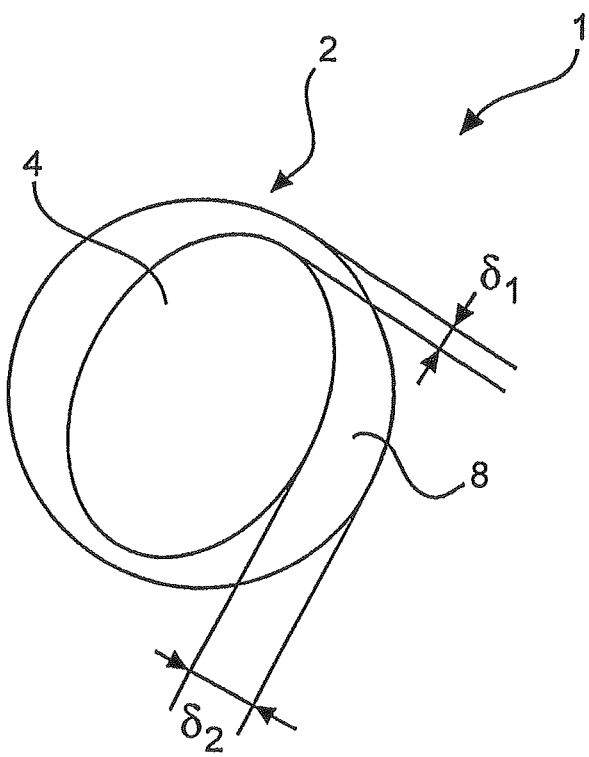
FIG. 2 shows a diagrammatic axial view of possible asymmetries due to elasticities of the rotor.

FIG. 2 illustrates a variation in the air gap thickness δ due to elasticity of the components of the synchronous generator, in particular the rotor. For illustration purposes, FIG. 2 basically shows only the air gap 8, that is to say the outer boundary of the rotor 4 and the inner boundary of the stator 2. The example in FIG. 2 shows elasticity in a main direction, namely substantially upwardly and downwardly in the view. That results in the variation in the air gap 8 which leads to a small air gap thickness $δ_1$ in one region and a large air gap thickness $δ_2$ in another region. The eccentricity shown in FIG. 1 can be added to the variation due to elasticity. Deformation by virtue of elasticity can be caused or increased by the influence of forces like mass forces, gravitational forces and magnetic forces.

Figure 3:
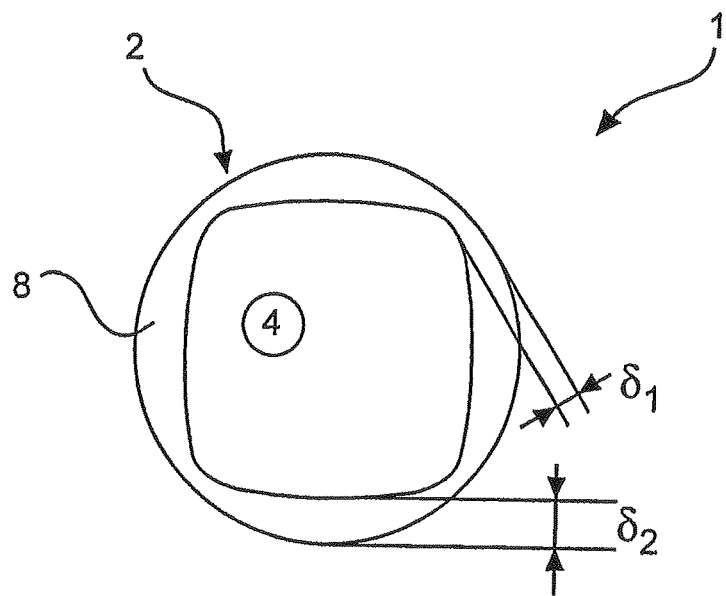
FIG. 3 shows a diagrammatic axial view of a further example of an asymmetry due to elasticities of the rotor of a synchronous generator.

FIG. 3 shows a further example for different air gap thicknesses δ1 and δ2 for a deformation, occurring by virtue of elasticities, in two main directions. Thus, illustrated by a view on an exaggerated scale, the rotor 4 has a deformation towards the shape of a square.

With a current flow in the pole windings of a pole wheel, which is sufficiently identical, magnetic flux densities are produced in the air gap, which flux densities are also referred to as magnetic induction and depend on the local thickness of the air gap δ. With a non-constant air gap thickness, a direct consequence of that local dependency of the thickness of the air gap is different radial force densities $∂F_{mr}/∂A$ on the surfaces of the components. In that respect—speaking in graphic terms—$∂F_{mr}$ describes the radial force for a surface portion which is specified as $∂A$. Thus there are higher force densities at smaller air gap thicknesses.

Figure 4:
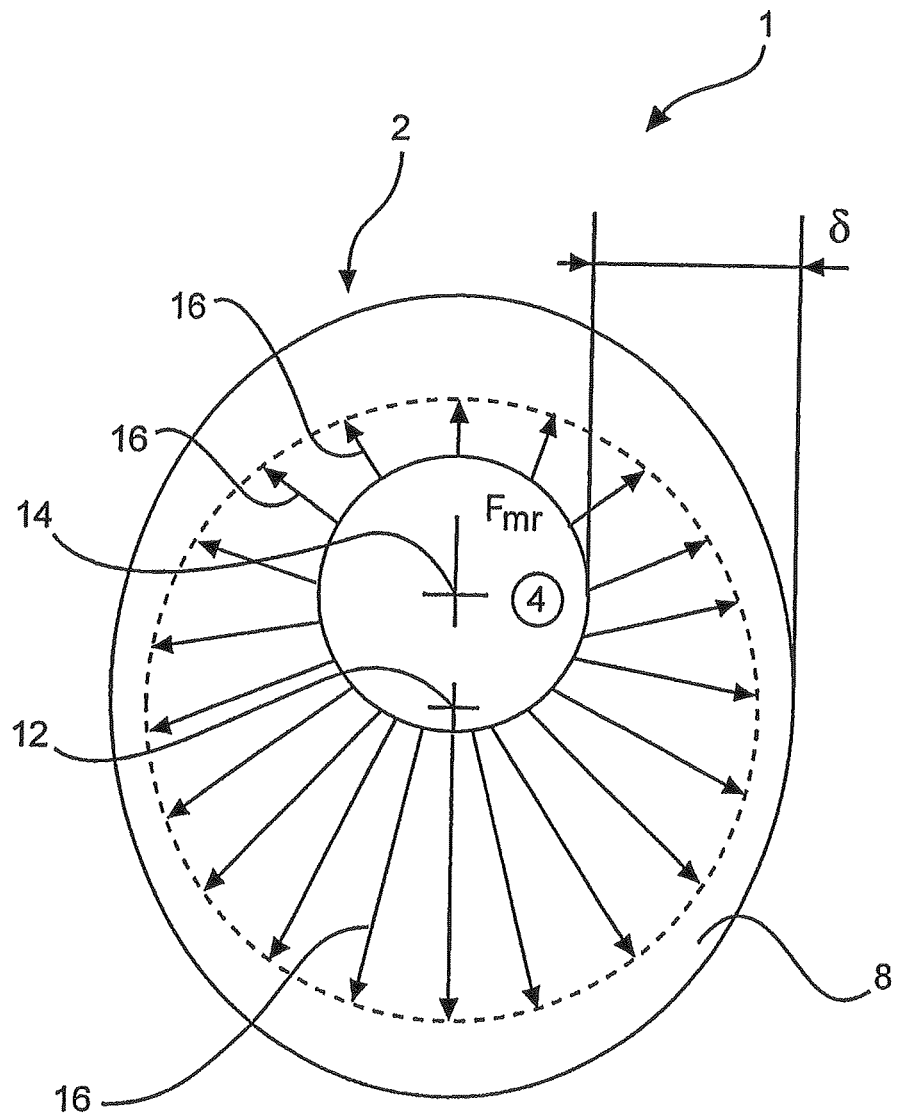
FIG. 4 shows a diagrammatic axial view of the relationship between magnetic force density in a synchronous generator in dependence on the respective air gap thickness.

FIG. 4 illustrates the magnetic force $F_{mr}$ in the synchronous generator 1 which is shown in diagrammatically highly simplified form. In the view in FIG. 4 the rotor 4 is displaced with its rotor center point 14 relative to the stator center point 12, thereby resulting in an air gap 8 of different air gap thickness δ. In that respect the air gap 8 is shown on an exaggerated scale to clearly illustrate the different air gap thickness δ on the basis of the principle thereof. FIG. 4 is based on a uniform flow of current through the pole windings so that, with a geometrical symmetry, a uniform distribution of the force density would also result. Because of the different air gap thicknesses however, that results in different high radial forces and thus different high radial force densities $∂F_{mr}/∂A$. In FIG. 4 the forces are shown by corresponding lengths for the force arrows 16. A broken line along the arrow tips of the force arrows 16 is intended to show the force field formed asymmetrically around the rotor 4. By virtue of the exaggerated view, FIG. 4 shows that the magnetic force is greater, the smaller the air gap thickness δ is.

The effect that a higher radial force density occurs with a smaller air gap thickness causes an increase in the differences in the thicknesses δ in the air gap 8, which were described with reference to FIGS. 1 to 3, that is to say the differences due to eccentricity and due to elasticity. In that respect the effect leads to non-compensated magnetic forces on the stator and the pole wheel or rotor. The radial magnetic force density $∂F_{mr}/∂A$ which is illustrated by the force arrows 16 in FIG. 4 results in a non-compensated magnetic force $F_{mr}$ due to integration of the radial magnetic force density $∂F_{mr}/∂A$ over the entire surface in accordance with the following formula:

$$F_{mr} \int_A \frac{\delta F_{mr}}{\delta A} \delta A$$

Figure 5:
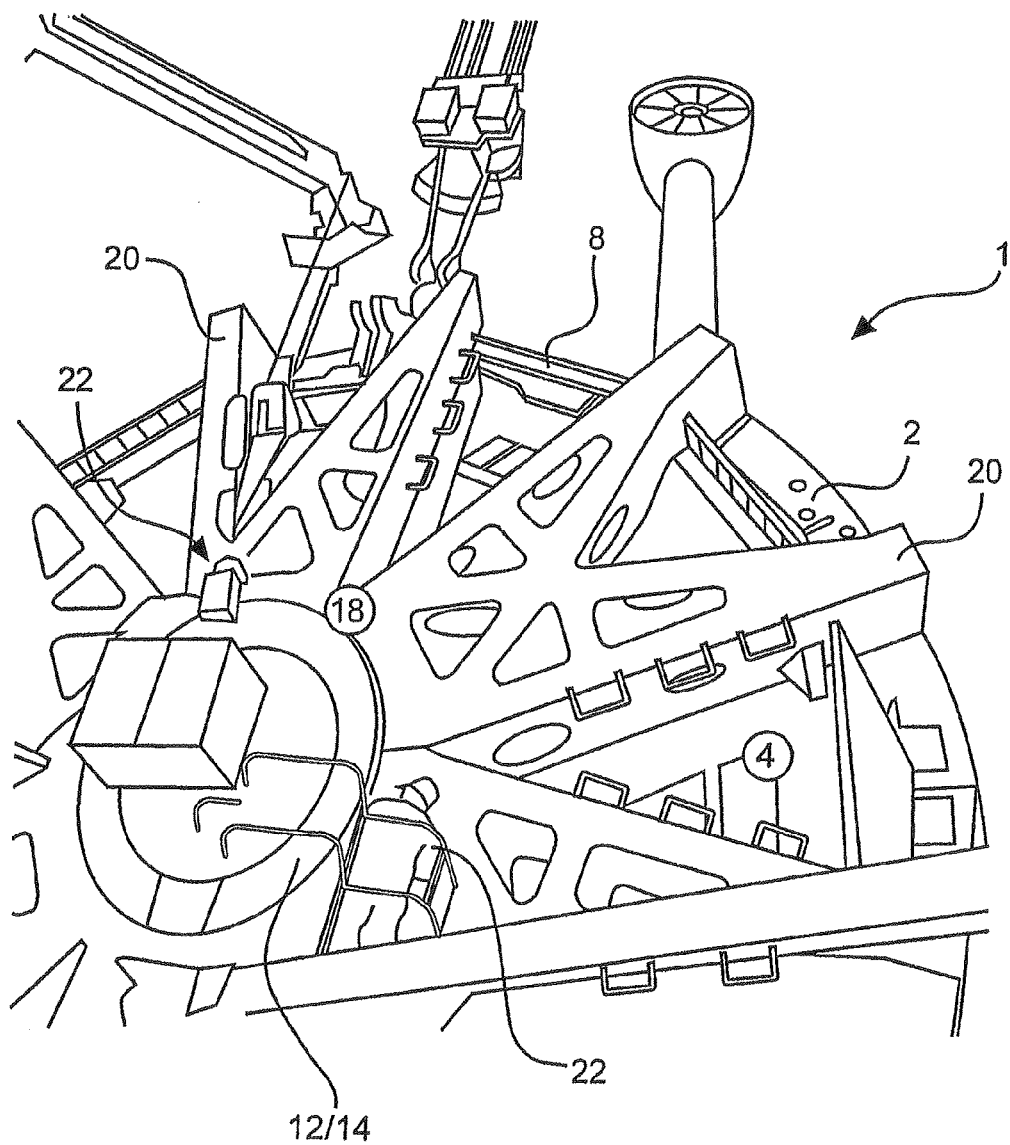
FIG. 5 shows a perspective view of a portion of a ring generator of a wind power installation, FIG. 6 diagrammatically shows effects and relationships of the control of exciter currents in different pole windings in a diagrammatic partial view of a synchronous generator, FIG. 7 diagrammatically shows an apparatus implementation of an individual rotor current control referring to the example of a solution which uses the entire winding of the respective pole of the pole wheel, FIG. 8 diagrammatically shows the implementation of a rotor current control when using only a part of each pole winding of the pole wheel for a variation in the exciter current in question.

A portion of a synchronous generator 1 is shown in FIG. 5 to give an idea of the dimension of a synchronous generator for a wind power installation. The view in FIG. 5 shows a stator carrier 18 which has various stator carrier arms 20 and as a result looks somewhat of a star-shaped configuration and can also be referred to as a star-shaped carrier or a star-carrier. FIG. 5 also shows a synchronous generator 1 with an externally disposed stator 2 and an internally disposed rotor 4, that is to say an internal rotor. The air gap 8 can admittedly not be seen in FIG. 5, but its approximate position is also illustrated there by reference 8. To illustrate the size of the synchronous generator 1, FIG. 5 shows people 22 who are occupied with the construction of a wind power installation. Approximately the stator center point 12 and also the rotor center point 14 are disposed in the region of a working cage. At the air gap the illustrated synchronous generator 1 is approximately of a diameter of 10 m—this is also referred to as the air gap diameter—and nonetheless the air gap thickness δ is only a few millimeters.

It will thus be clear that admittedly a variation in the air gap does not occur to the extent as would be seen from the magnitude in the exaggerated views in FIGS. 1 to 4, but nonetheless a variation in the thickness of the air gap of for example a millimeter can occur, with an air gap diameter of 10 m, depending on the respective stiffening of the parts concerned, a variation of 1 mm in the thickness of the air gap would correspond to one ten thousandth of the diameter of the air gap, measured on this example, that is to say a deformation of the diameter by only 0.01%.

To avoid contact between the pole wheel and the stator those two components are to be mechanically stiffened in such a way that the non-compensated magnetic forces which are inevitably caused by production and assembly tolerances and by material elasticities can be absorbed by the carrier structure. Such a carrier structure is formed by the stator carrier 18 in FIG. 5, which can also be referred to as the generator star of the stator. In that respect FIG. 5 shows the generator star of the stator of a wind power installation E112 from Enercon GmbH.

With an increasing diameter of the ring generator, the amount of material used increases greatly and considerably increases the generator mass. One or more embodiments of the invention aims at a reduction in the disadvantages associated with larger ring generators, and in particular therefore the possibility of a reduction in material as far as possible without reducing the safety and reliability of the synchronous generator and thus the wind power installation overall.

Figure 6:
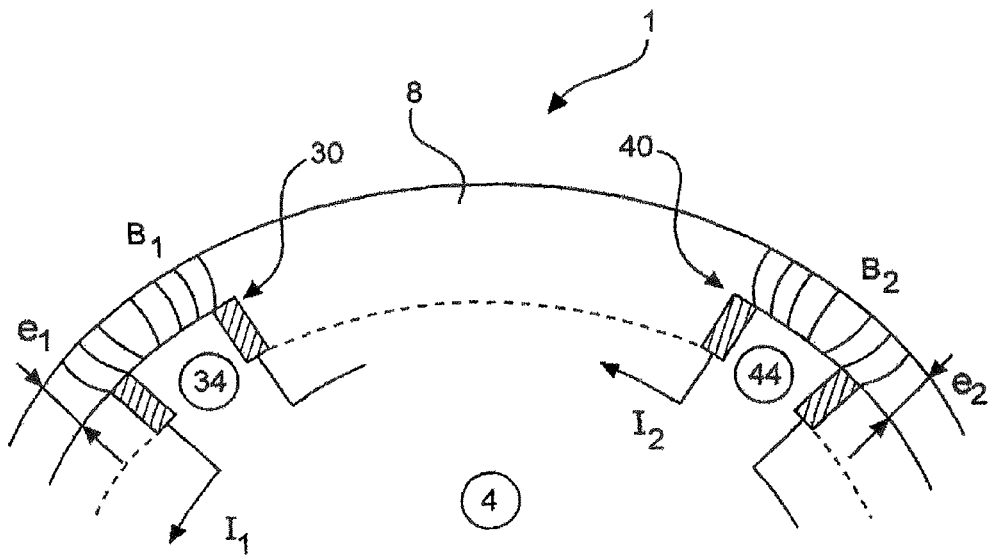

To counteract asymmetries and the consequences and dangers resulting therefrom the currents I of all or some pole windings are so controlled in dependence on the respectively local air gap thickness δ that the differences in respect of magnetic inductions B are as small as possible. That is shown in FIG. 6 by way of example on the first rotor pole 30 and the second rotor pole 40. Those rotor poles 30 and 40 are only shown by way of example and representatively of further poles (not shown), in particular in the view in FIG. 6 further rotor poles are also disposed between the first and second rotor poles 30, 40. FIG. 6 concern a synchronous generator 1 having a multi-pole rotor 4. Formed between each of the two rotor poles 30 and 40 is the air gap 8 which is of differing thicknesses, namely the air gap thickness $δ_1$ in respect of the first rotor pole 30, and the thickness $δ_2$ in respect of a second rotor pole 40. Accordingly there is a first and a second magnetic field respectively with the magnetic induction $B_1$ and $B_2$. Each of the rotor poles 30 and 40 has a respective pole winding 32 and 42 which surround a respective core 34 and 44 respectively, guiding a magnetic field in the rotor pole 30 and 40 respectively in question. The magnetic field is generated by the respective exciter currents I1 and I2 flowing through the pole winding 32 and the pole winding 42 respectively.

The magnetic induction B1 and B2 depends on the air gap thicknesses $δ_1$ and $δ_2$ and can also be influenced by suitable control of the corresponding exciter current I1 and I2 respectively. This is intended to influence the magnetic induction B1 and B2 and thereby also the air gap thicknesses $δ_1$ and $δ_2$ respectively. If for example the air gap thickness $δ_1$ of the first rotor pole 30 is smaller than the air gap thickness $δ_2$ of the second rotor pole 40 it is proposed that the exciter current $I_1$ is to be set smaller than the exciter current $I_2$. Preferably the setting is effected in such a way that the magnetic induction of both rotor poles 30 and 40 is equal so that the equation $B_1=B_2$ is fulfilled as much as possible.

Figure 7:
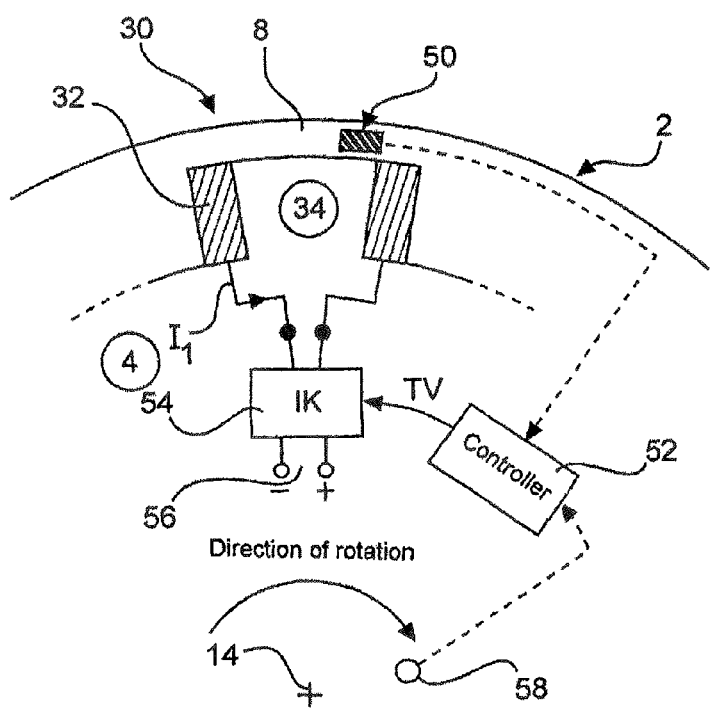

A possible form of technical implementation is diagrammatically shown in FIG. 7. Accordingly, arranged on some and preferably each rotor pole is a thickness sensor and/or a magnetic field sensor which can also be referred to as the 'B' sensor. For example a Hall probe can be considered as the magnetic field sensor. FIG. 7 shows by way of example for the first rotor pole 30 a magnetic field sensor 50 which measures the magnetic field, namely the magnetic induction in the air gap 8, in the region of that first rotor pole 30. The result is passed to a control unit 52 which can also be referred to as the 'Controller'. That control unit evaluates the result of the magnetic field sensor 50 and passes a control signal to a control member 54 which can be in the form of a transistor or which can have at least one transistor as an essential component for performing current control. The control signal can provide a pulse duty factor TV which specifies the pulse-space ratio for a current control, namely the ratio of the pulse duration to the overall duration of a period, namely the sum of pulse and space. The control member 54 then controls the field current I1 flowing through the pole winding 32 of the first rotor pole 30, in dependence on the measurement result of the magnetic field sensor 50. For that purpose the control member 54 can be supplied with direct current by way of a direct current terminal 56. The control unit 52 can additionally receive information about the currently prevailing rotary angle of the rotor 4, from a rotary angle sensor 58, while the rotor 4 is rotating about its rotor center point 14. That makes it possible to evaluate additional items of information which were previously recorded and which depend on the absolute position of the rotor 4 and thus the first rotor pole 30 shown by way of example. The rotary speed of the rotor 4 can also be derived from the rotary angle sensor and a control in the controller can be correspondingly set.

For example the dynamics, that is to say the regulating speed, of the regulator implemented in the control unit 52 can depend on the rotary speed. In addition, by means of the respectively detected rotary angle and the result of the magnetic field sensor 50—or a thickness sensor—rotary angle-dependent values, in particular rotary angle-dependent asymmetries, can be recorded in order to improve the control, in particular to improve it with an increasing number of revolutions performed by the rotor 4.

Figure 8:
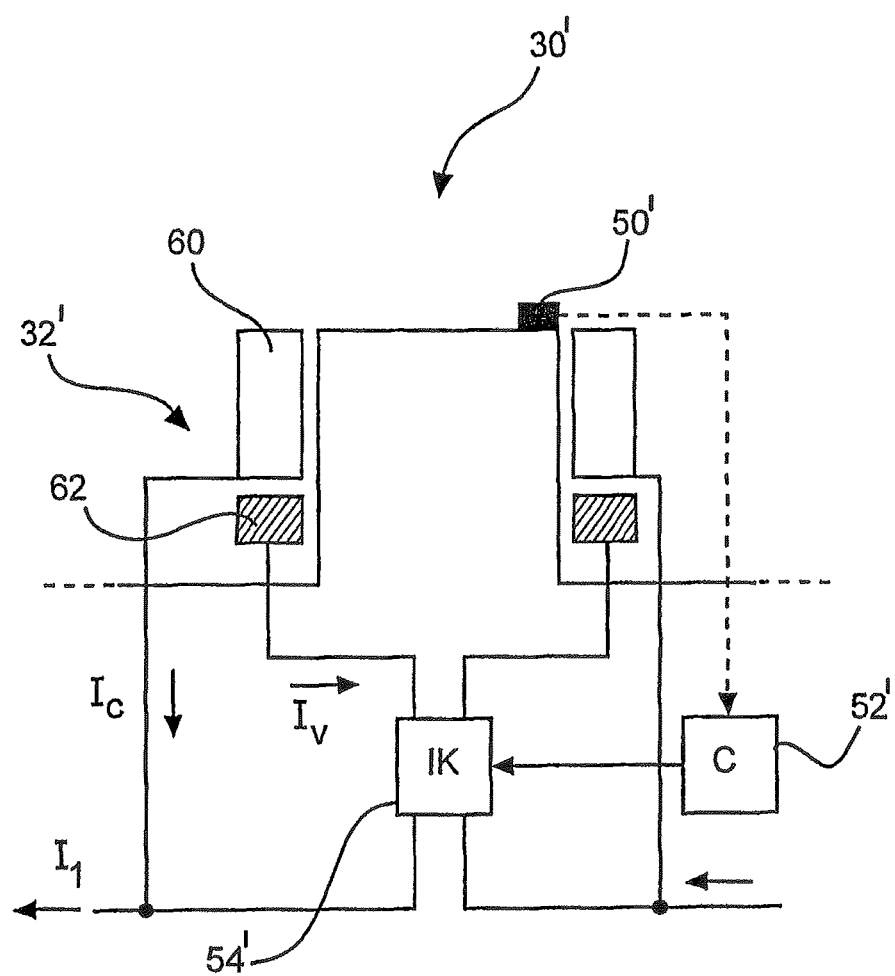

FIG. 8 shows another embodiment wherein a first rotor pole 30' has a pole winding 32' which is subdivided into a first winding portion 60 and a second winding portion 62. A constant current component $I_C$ flows through the first winding portion 60 and a variable current component $I_V$ flows through the second winding portion 62. The two currents together form the total exciter current $I_1$. In this embodiment therefore only the variable current $I_V$ is controlled by the control member 54'. In that way, the control member 54 can be of smaller dimensions than if the entire current $I_1$ would have to flow through that control member 54'. At the same time an excessively great variation, in particular a variation which is excessively great by error, in the exciter current $I_1$ is prevented by the constant component $I_C$. In this case also control can be effected in dependence on the measurement of magnetic induction by means of the magnetic field sensor 50' and with further utilization of a control unit 52' which can also be in the form of a microprocessor and which can be referred to as a controller. The control unit 52' correspondingly passes a control signal to the control member 54'. The control unit 52' in FIG. 8 can also process further items of information like measurements of a rotary angle sensor and/or previously determined measurement values or further measurement values detected in the course of operation.

Thus there are provided various variants for providing individualized exciter current control for individual rotor poles or for groups of rotor poles. The connection of a complete winding of each pole of the pole wheel or a partial winding of each pole of the pole wheel is considered. For control purposes it is possible to use a buck or a boost converter which for example can form the control member 54 in FIG. 7 or the control member 54' in FIG. 8. Such a buck and boost converter can be provided for individual poles or for pole groups. Preferably the use of a computing unit is proposed or the use of thickness and/or induction sensors. Preferably moreover there is provided a rotary angle sensor.

Figure 9:
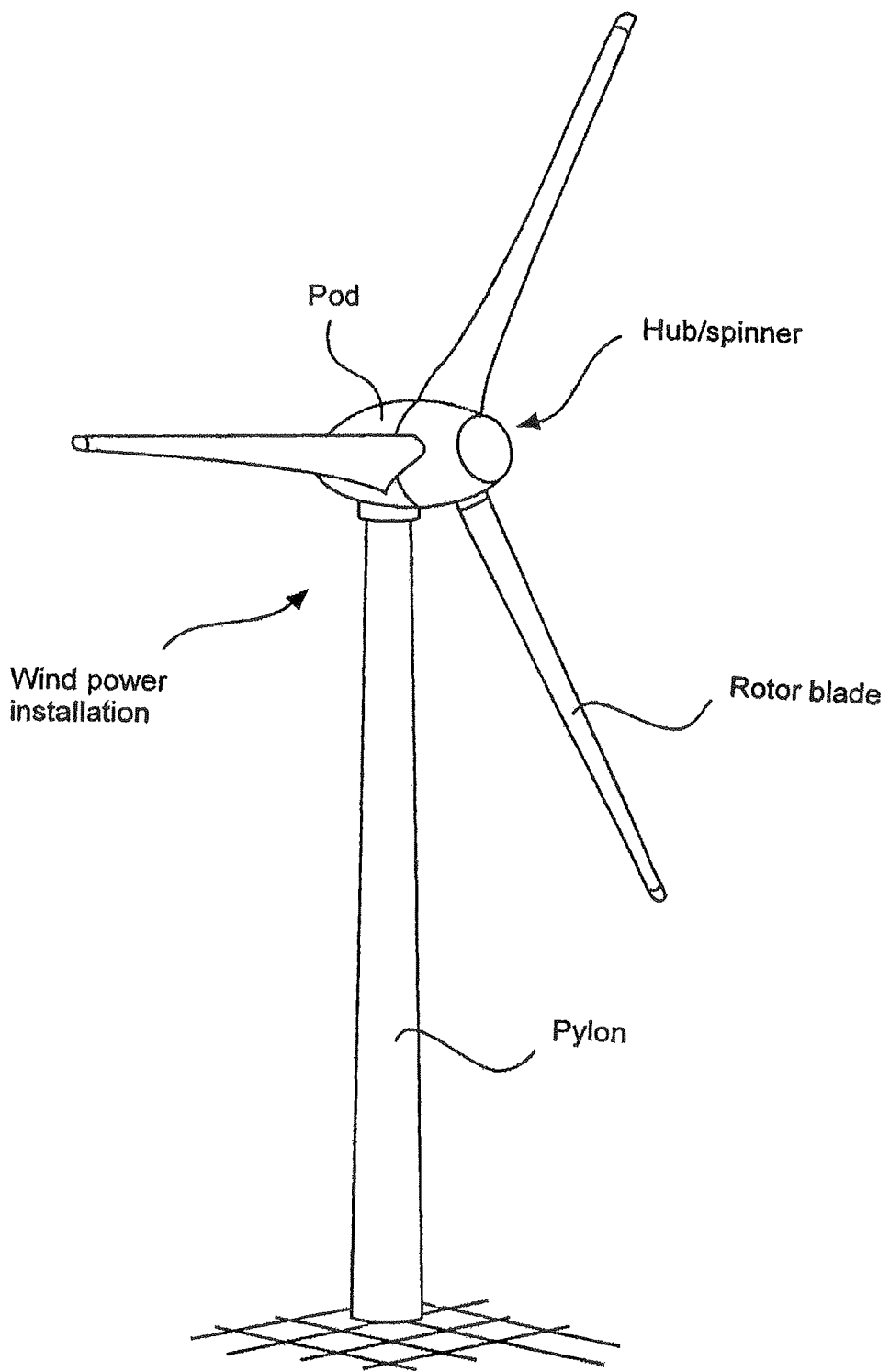
FIG. 9 shows a diagrammatic perspective view of a wind power installation.

FIG. 9 shows a perspective view of a wind power installation. That wind power installation has a pod having a rotor with three rotor blades, which is arranged variably in its position on a pylon. A synchronous generator according to the invention and correspondingly a control according to the invention for the synchronous generator are disposed in the pod approximately in the region of the hub or the spinner which basically denotes the rotating part of the wind power installation without the rotor blades.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of controlling a wind power installation having a generator having a stator, a pole wheel that includes a plurality of rotor poles with a respective pole winding, and an air gap between the stator and the pole wheel, the method comprising:
controlling a respective exciter current through each pole winding, and wherein further including at least one of the following two steps:
varying at least one of the exciter currents through a first pole winding relative to at least one of the exciter currents through a second pole winding; and
varying at least one of the exciter currents in dependence on a position of the pole wheel relative to the stator.

2. The method according to claim 1 wherein at least one of the exciter currents is rotationally cyclically varied and is asynchronously controlled relative to a further exciter current and is reduced or increased by a constant compensation component.

3. The method according to claim 1 wherein the exciter current of at least one rotor pole is controlled in dependence on a spacing of the respective rotor pole relative to the stator.

4. The method according to claim 1 wherein the exciter current of at least one rotor pole is controlled in dependence on an instantaneous magnetic field in a region of the respective rotor pole.

5. The method according to claim 1 wherein at least one of the exciter currents is controlled in dependence on previously detected asymmetries of the stator, the pole wheel, and the air gap.

6. The method according to claim 1 wherein at least one exciter current is controlled so that variations in the air gap thickness are at least partially counteracted.

7. The method according to claim 1 further comprising:
measuring an air gap thickness in the region of at least one rotor pole; and
measuring a magnetic flux density in the air gap in the region of at least one rotor pole, wherein at least one of the exciter currents is controlled in dependence on at least one of the measured air gap thickness and the measured magnetic flux density.

8. The method according to claim 1 wherein the exciter current of at least one rotor pole is increased when the air gap thickness in the region of said rotor pole is increased or the exciter current of said rotor pole is reduced when the air gap thickness in the region of said rotor pole is reduced.

9. The method according to claim 1 wherein the variation in the at least one exciter current is effected only in a part of the respective pole winding or the variation in the at least one exciter current is so effected that a part of the respective pole winding is electrically switched on or off.

10. A wind power installation comprising:
a generator having:
a stator;
a pole wheel with a plurality of rotor poles, each having a respective pole winding for producing a magnetic field through the respective rotor pole; and
an air gap between stator and pole wheel;
a control unit for controlling a respective exciter current through each of the pole windings, the control unit being configured to vary at least one of the following:
at least one of the exciter currents relative to another one of the exciter currents; and
at least one of the exciter currents in dependence on the position of the pole wheel in relation to the stator.

11. The wind power installation according to claim 10, wherein the control unit is configured to vary the throttling of the exciter current in each pole winding, respectively.

12. The wind power installation according to claim 10 comprising:
at least one spacing measuring means for measuring the air gap thickness in the region of a respective rotor pole, wherein the spacing measuring means is connected to the control unit so that at least one exciter current can be controlled in dependence on the measured air gap thickness.

13. The wind power installation according to claim 10 wherein the generator is in the form of a ring generator.

14. A synchronous generator for use in a wind power installation for converting a rotary movement caused by the wind into electric energy, the generator comprising:
a stator;
a pole wheel with at least two rotor poles having a respective pole winding for producing a magnetic field guided in the respective rotor pole; and
an air gap between stator and pole wheel;
a control unit for controlling a respective exciter current through each of the pole windings;
the control unit being adapted to vary at least one of the following:
at least one of the exciter currents relative to at least one further one of the exciter currents; and
at least one of the exciter currents in dependence on the position of the pole wheel in relation to the stator.

15. The wind power installation according to claim 10 further comprising:
at least one flux density measuring means for measuring the magnetic flux density in the air gap in the region of a respective rotor pole, wherein the flux density measuring means is connected to the control unit so that at least one exciter current can be controlled in dependence on the measured magnetic flux density.

* * * * *

UNITED STATES PATENT AND TRADEMARK OFFICE
CERTIFICATE OF CORRECTION

PATENT NO.        : 9,143,071 B2                                                        Page 1 of 1
APPLICATION NO.   : 14/125828
DATED             : September 22, 2015
INVENTOR(S)       : Volker Diedrichs It is certified that error appears in the above-identified patent and that said Letters Patent is hereby corrected as shown below:

In the Claims

Column 13, Line 44:
"detected asymmetries of the stator, the pole wheel, and the air gap." should read, --detected asymmetries of at least one of the stator, the pole wheel, and the air gap.--.

Signed and Sealed this
Tenth Day of May, 2016

Michelle K. Lee
*Director of the United States Patent and Trademark Office*